Figure 15:
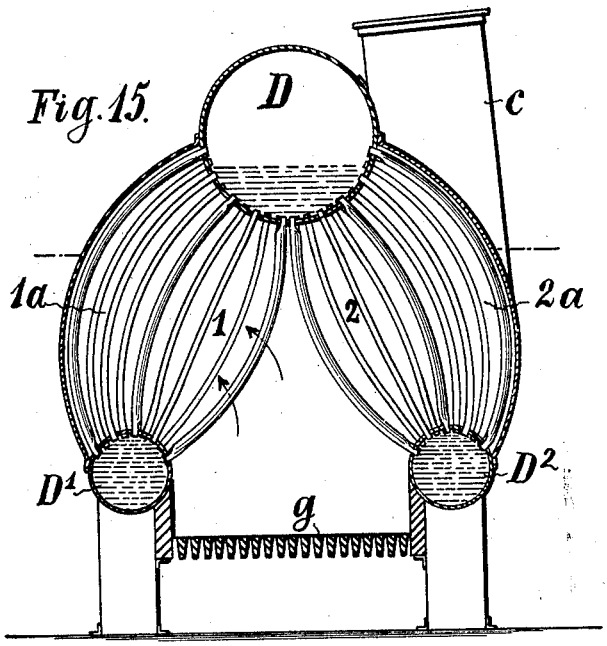

No. 737,782. PATENTED SEPT. 1, 1903.
R. SCHULZ.
STEAM GENERATOR.
APPLICATION FILED OCT. 7, 1901.
NO MODEL. 8 SHEETS—SHEET 1.
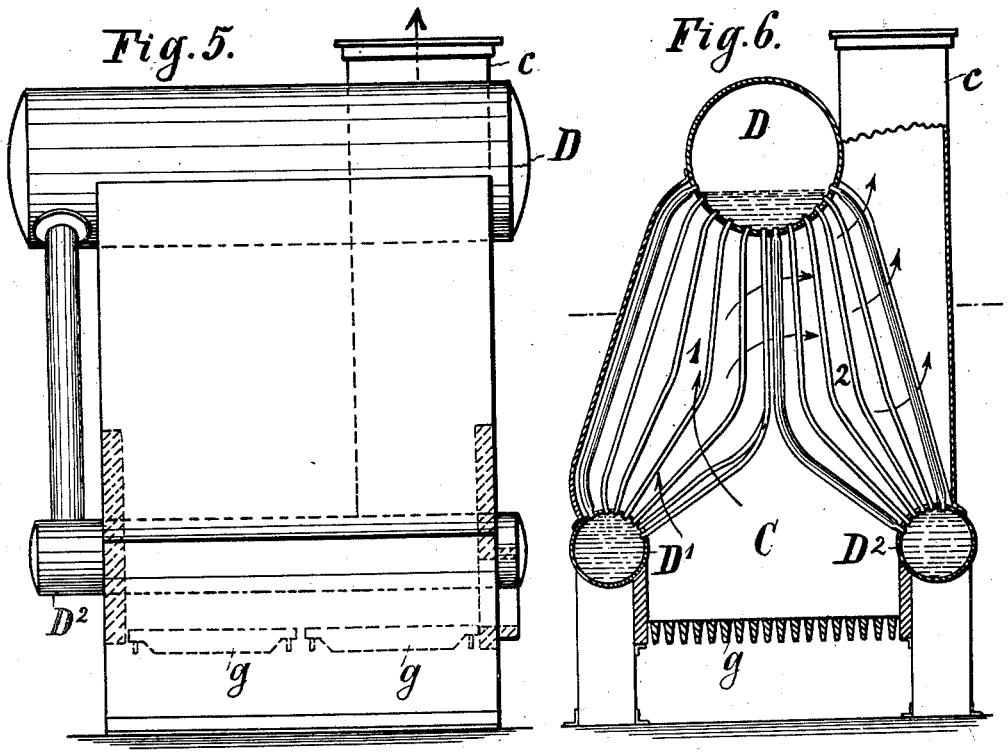
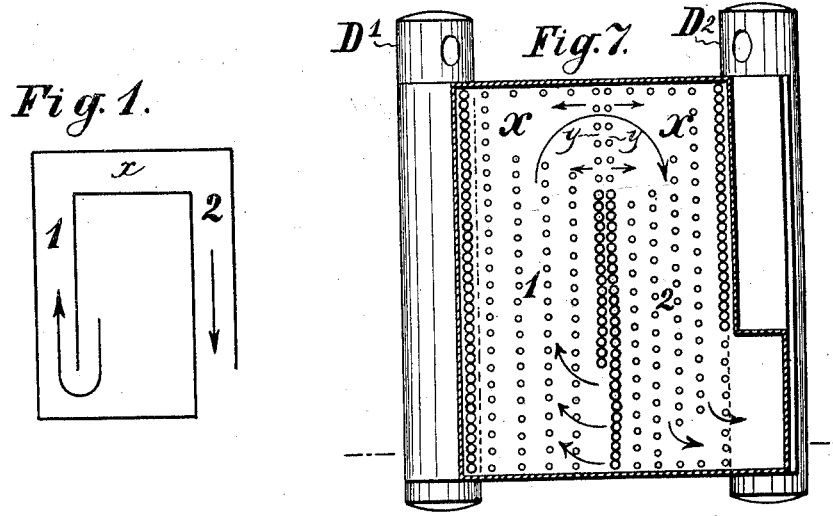
Witnesses:
Inventor
Richard Schulz.
By Henry Orth & Son
Attys

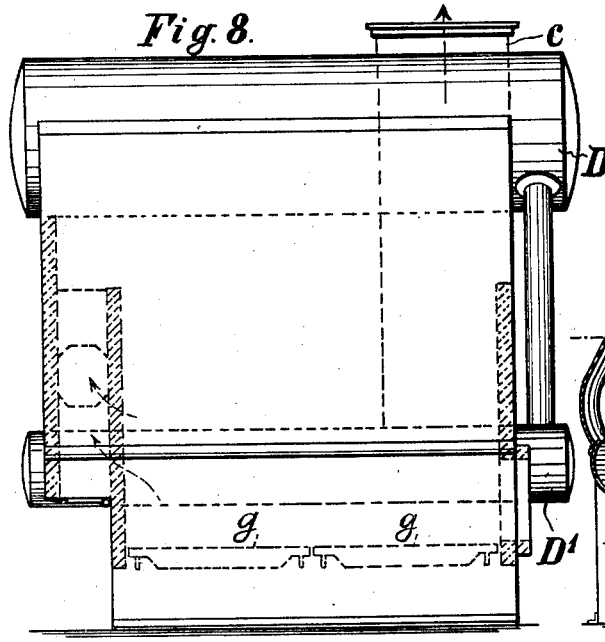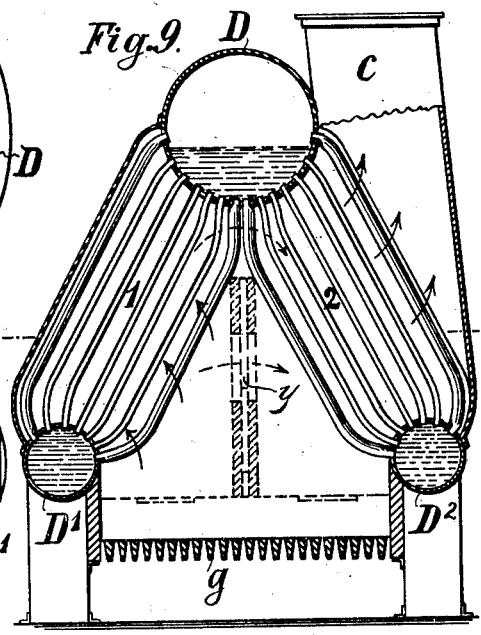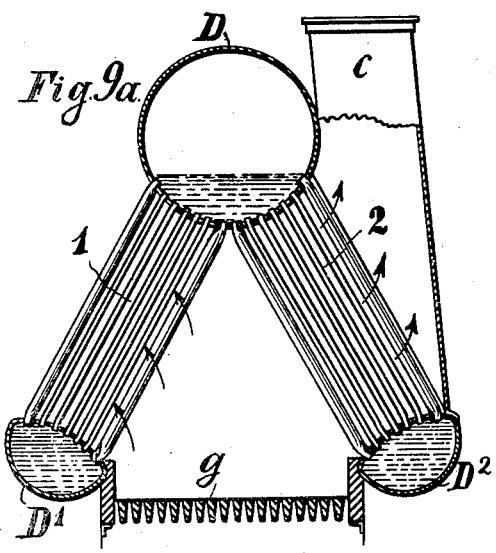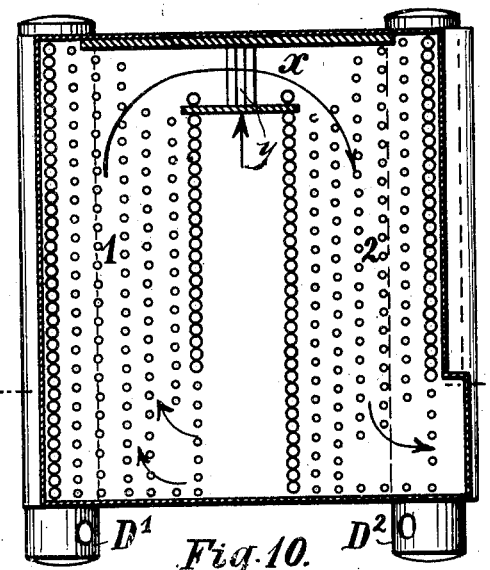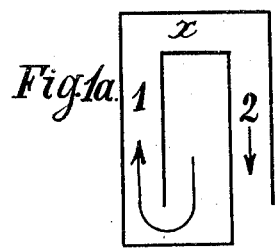

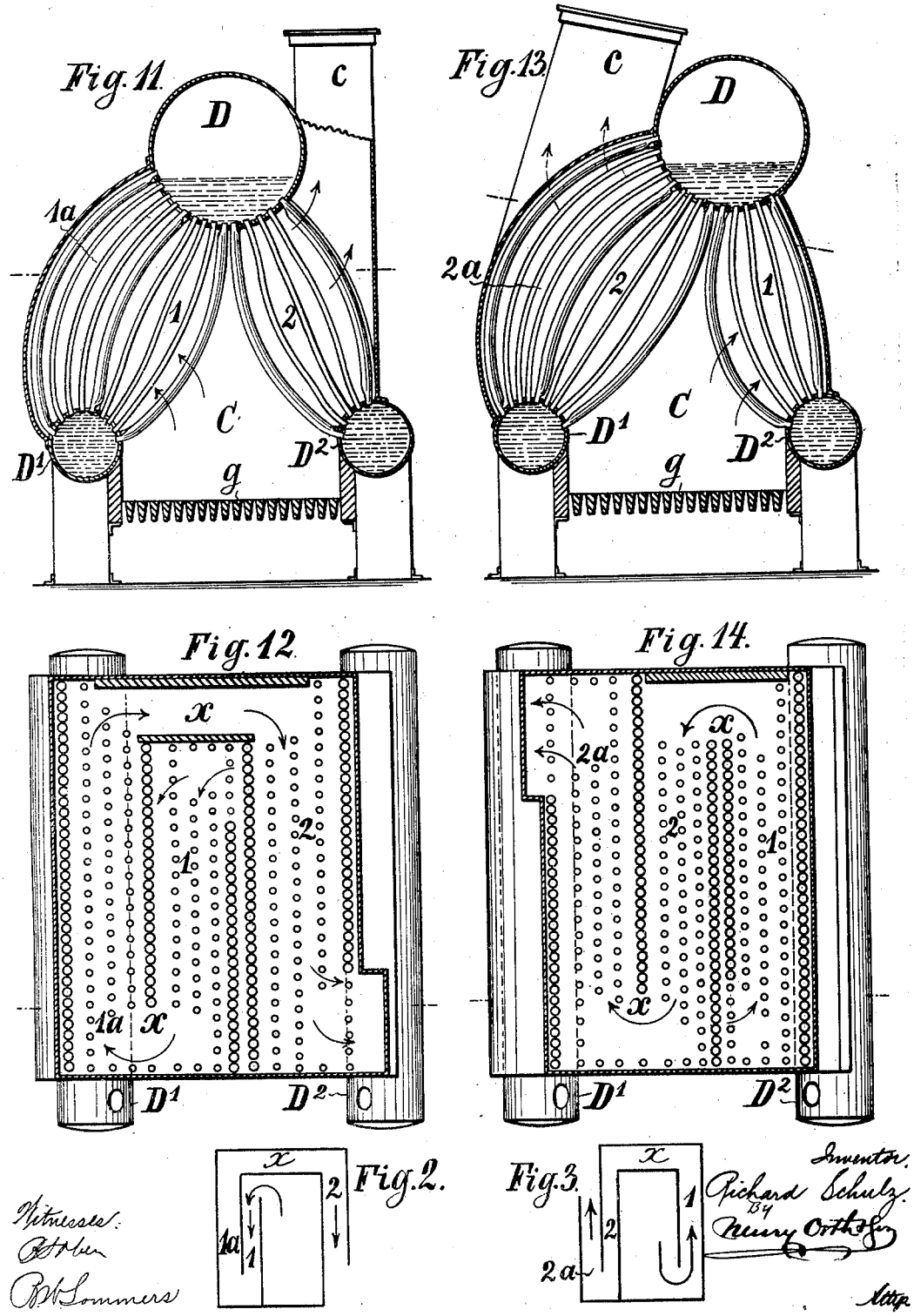

No. 737,782. PATENTED SEPT. 1, 1903.
R. SCHULZ.
STEAM GENERATOR.
APPLICATION FILED OCT. 7, 1901.
NO MODEL. 8 SHEETS—SHEET 4.

Witnesses: Inventor: Richard Schulz.

No. 737,782. PATENTED SEPT. 1, 1903.
R. SCHULZ.
STEAM GENERATOR.
APPLICATION FILED OCT. 7, 1901.
NO MODEL. 8 SHEETS—SHEET 6.
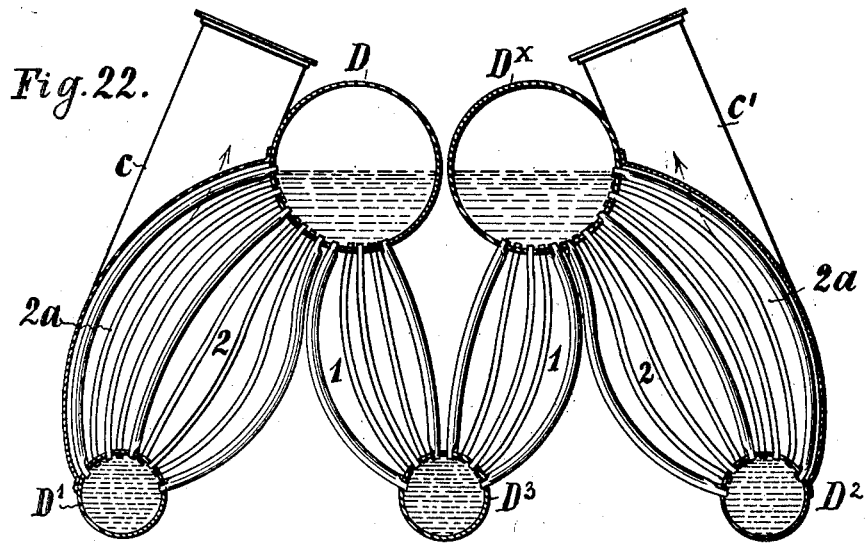
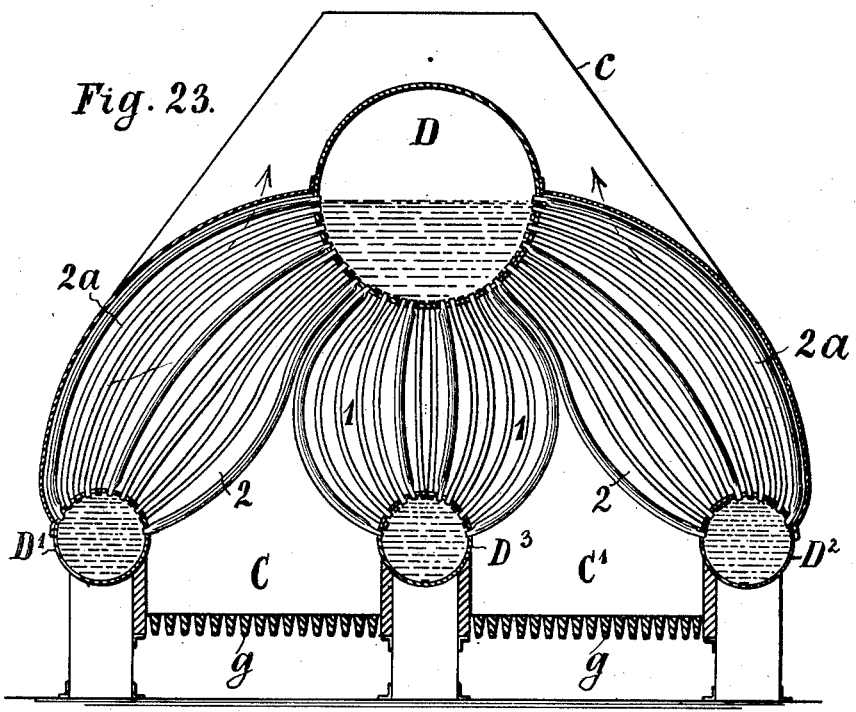
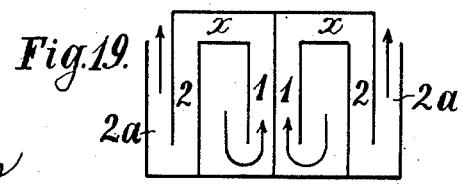

No. 737,782. PATENTED SEPT. 1, 1903.
R. SCHULZ.
STEAM GENERATOR.
APPLICATION FILED OCT. 7, 1901.
NO MODEL. 8 SHEETS—SHEET 7.
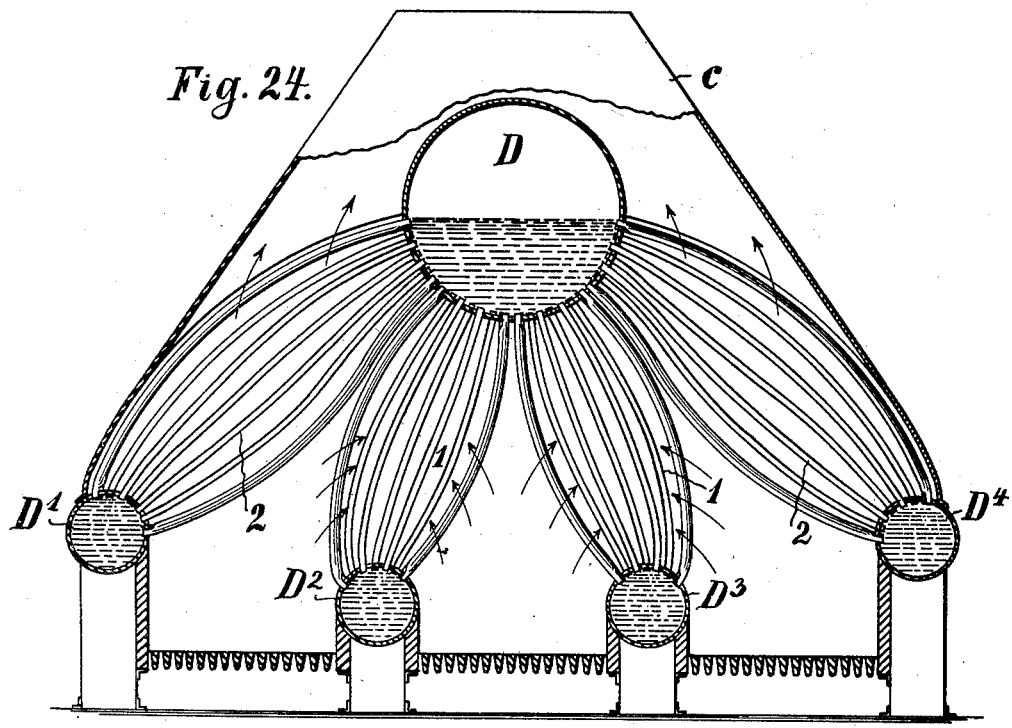
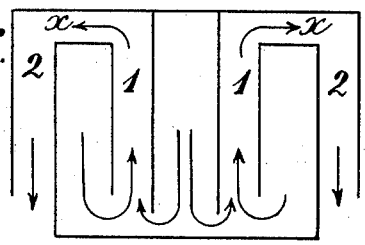

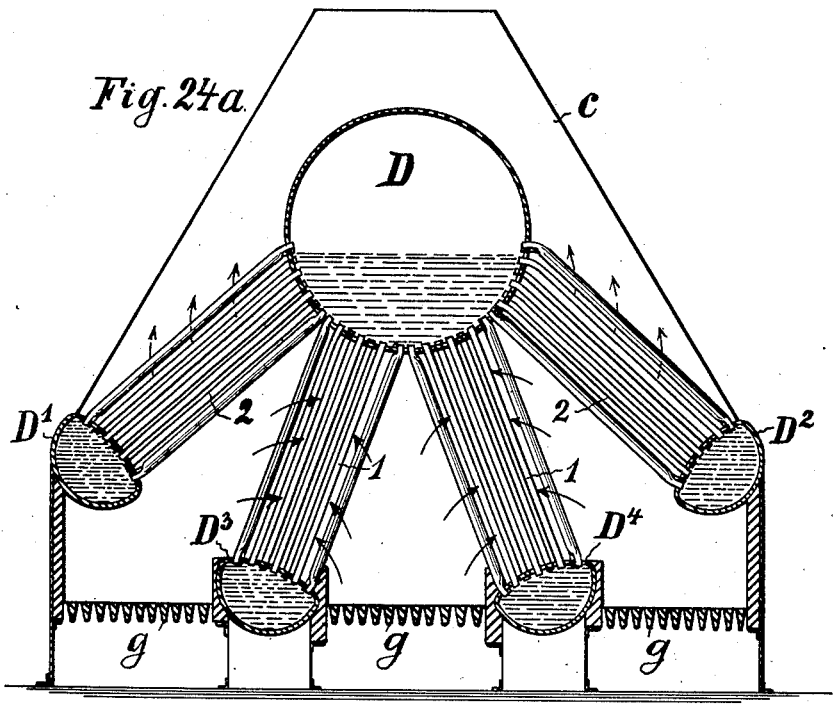
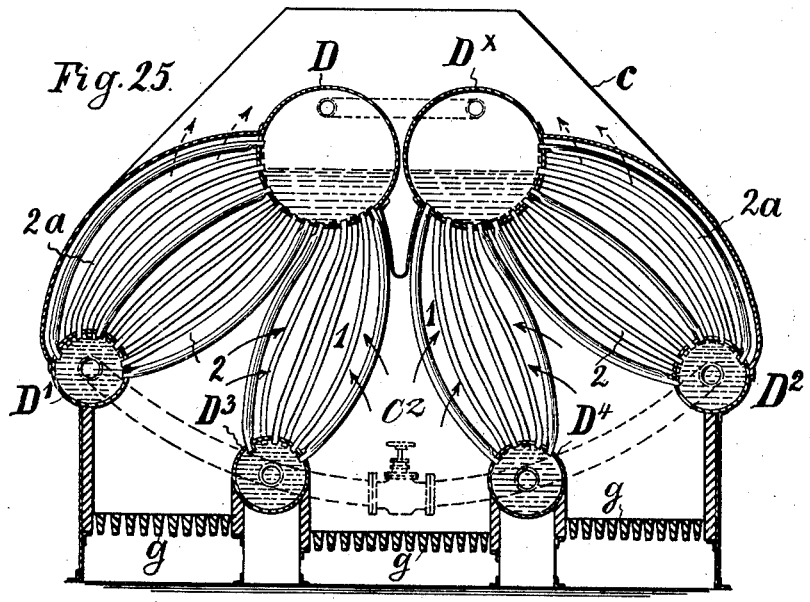

No. 737,782.                                         Patented September 1, 1903.

UNITED STATES PATENT OFFICE.

RICHARD SCHULZ, OF BERLIN, GERMANY.

STEAM-GENERATOR.

SPECIFICATION forming part of Letters Patent No. 737,782, dated September 1, 1903.

Application filed October 7, 1901. Serial No. 77,908. (No model.)

*To all whom it may concern:*

Be it known that I, RICHARD SCHULZ, a subject of the King of Prussia, German Emperor, residing at Berlin, Empire of Germany, have invented certain new and useful Improvements in Steam-Generators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to steam-generators, and more particularly to that type in which an upper drum is connected with two or more lower drums by means of tubes, some of which are arranged close together to form draft-flues.

The object of my present invention lies in the arrangement of connecting tubes of comparatively small cross-sectional area to form the walls of draft-flues, so as to cause the products of combustion to flow in an undivided stream or in a divided stream horizontally through said flues and around the groups of tubes therein to and fro about the full length of the combustion-chamber, according as the generator has two or more combustion-chambers, with a view to minimize the loss of heat and to utilize the latter to the best possible advantage.

My present invention has for its further object the admission into these flues at given points of products of combustion direct from the combustion-chamber, together with air, to effect the more complete combustion of those products which flow to and fro through the flues before they reach the chimney.

That my invention may be fully understood, I will describe the same in detail, reference being had to the accompanying drawings, in which—

Figures 1, 1ª, 2, 3, and 4 are flue diagrams of single-furnace generators, and Figs. 5 to 16 show various constructions of such generators, Figs. 5 and 8 being elevations, Figs. 6, 9, 9ª, 11, 13, and 15 vertical transverse sections, and Figs. 7 10, 12, 14, 16, and 17 horizontal sections. Figs. 18 and 19 are flue diagrams for twin-furnace generators, and Figs. 20, 21, 22, and 23 show by vertical transverse sections various constructions of such generators. Fig. 26 is a flue diagram of a triple-furnace generator, and Figs. 24, 24ª, and 25 show by vertical transverse sections various constructions of such generators.

Referring to Figs. 1, 5, 6, and 7, D indicates the upper drum, and D' D² the two lower drums; C, the combustion-chamber; g, the grate, and c the chimney. The upper and lower drums are connected by two sets of tubes of comparatively small cross-section, and from Figs. 1 to 7 it will be seen that some of these tubes are arranged in a well-known manner close together to form the walls of a continuous flue of practically twice the length of the generator, as shown in Figs. 1 and 7. The products of combustion flow from the combustion-chamber C at the forward end thereof into the longitudinal member 1 of the flue formed by tubes connecting drums D and D', thence through the cross flue member $x$ at the rear end to the longitudinal flue member 2, parallel to 1, and from the forward end of said flue member 2 to the chimney $c$, as indicated by arrows, Figs. 1 and 7. In practice I prefer to admit fire-gases and air, preferably preheated, or another supporter of combustion to the described draft-flue at some point intermediate of its inlet and outlet, and for this purpose I prefer to form chambers in connecting flue member $x$ by omitting as many tubes as may be necessary and to form suitable openings for the admission of fresh fire-gases into said chambers, together with heated air, which openings I preferably form on either side of the longitudinal intermediate tube-partition, as shown in Fig. 7 at $y$, as well as in Figs. 9 and 10.

An arrangement of draft-flue similar to the one described is shown in the constructions Figs. 1ª, 8, 9, 9ª, and 10, Fig. 9ª showing a modification in which the generator-tubes are preferably straight, and, as shown in Figs. 1ª and 10, the longitudinal flue members 1 and 2 are also formed by tubes connecting the drum D with the drums D' D², said flue members being connected at the rear end by a cross connecting member $x$, whereby a flue of about twice the length of the generator or combustion-chamber is also obtained.

In the construction shown in Figs. 2, 11, and 12 the tubes which connect drums D and D' are arranged to form a dividing-partition, thus forming two parallel longitudinal flue members 1 and 1ª, while a third longitudinal flue member 2, parallel to the flue members 1 and 1ª, is formed by tubes connecting drum D with drum $D^2$, the outer longitudinal flue members 1ª and 2 being connected at their rear ends by a transverse flue member $x$, to which fresh fire-gases and air are or may be admitted, the flow of the products of combustion from combustion-chamber C through the flue to the chimney $c$ being here also indicated by arrows.

In the last-described arrangement I obtain a flue composed of three longitudinal parallel members connected at their rear ends by a transverse member—namely, a flue of nearly three times the length of the generator or combustion-chamber. A somewhat similar arrangement is shown in Figs. 3, 13, and 14, the flue member 1 at the right being formed by tubes connecting drums D and $D^2$, while the flue members 2 and 2ª are formed by tubes connecting drums D and D', the flow of the products of combustion from the combustion-chamber C through flue members 1, $x$, 2, and 2ª to the chimney $c$ being indicated by arrows, and fire-gases and air are or may be admitted to one or both the cross connecting flue members $x$.

Figure 16:
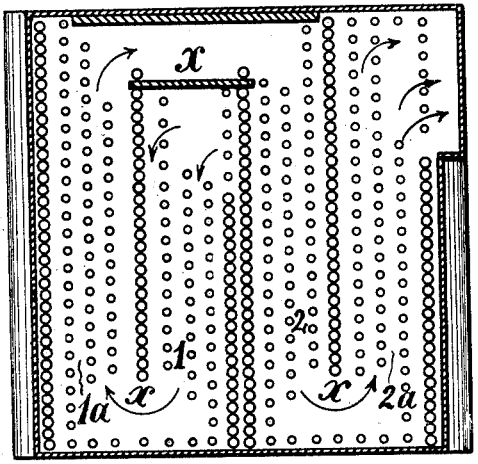
Figure 4:
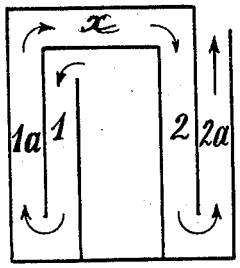

In Figs. 4, 15, and 16 I have shown another arrangement of continuous flue having four parallel longitudinal flue members 1 1ª and 2 2ª, those 1 and 1ª being formed by tubes connected with drums D and D' and those 2 and 2ª by tubes connected with said drum D and with drum $D^2$, whereby a continuous flue nearly four times the length of the generator or combustion-chamber is obtained, fire-gases and air being or may be admitted to the rear cross connecting flue member $x$, the flow of the products of combustion from the combustion-chamber through flue members 1, 1ª, $x$, 2, and 2ª to the chimney $c$ being indicated by arrows in Figs. 4 and 16. In single-furnace generators the described arrangement has the advantage that the outlet of the products of combustion from the generator does not take place over the full length thereof and on either side of the upper drum D, but only along a comparatively short length of the generator and on one side only of the upper drum. I furthermore prefer to admit the products of combustion to the flues not along the full height of the latter, but in such a manner as to keep the hot products of combustion as they leave the combustion-chamber away from the under side of the upper drum and from the tubes connecting said drum at that point with the lower drums. If several boilers within a restricted space are to be connected together into a group, the connection of the combustion-chambers with the chimney presents considerable difficulty. The solution of this problem is greatly facilitated by the described arrangement of flues.

The possibility of locating the chimney either at the forward or rear end of the generator, according to the construction of the boiler, and the fact that the products of combustion are not carried around and above the upper drum to such chimney are of great advantage in that the height of the generator is materially reduced and can therefore be installed in a comparatively low ship's compartment.

Figure 20:
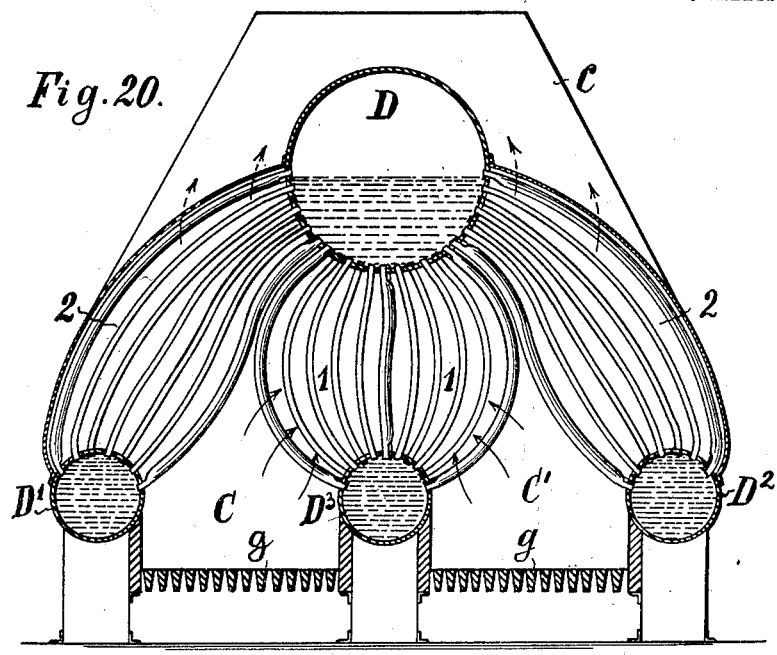
Figure 17:
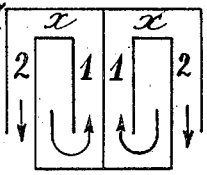
Figure 18:
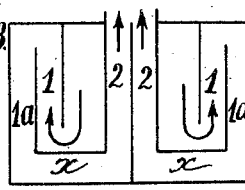

In Figs. 17 to 23 I have illustrated the application of my invention to twin-furnace generators having one or two upper drums connected with three lower drums. In Figs. 17 and 20 the outer parallel longitudinal members 2 of the two continuous flues are formed by tubes connecting the upper drum D with the outer lower drums D' $D^2$, while the intermediate longitudinal parallel members 1 1 of said two flues are formed by tubes connecting said upper drum with an intermediate lower drum $D^3$, the products of combustion-chambers C C' flowing through the flues, as clearly shown in Fig. 17.

Figure 21:
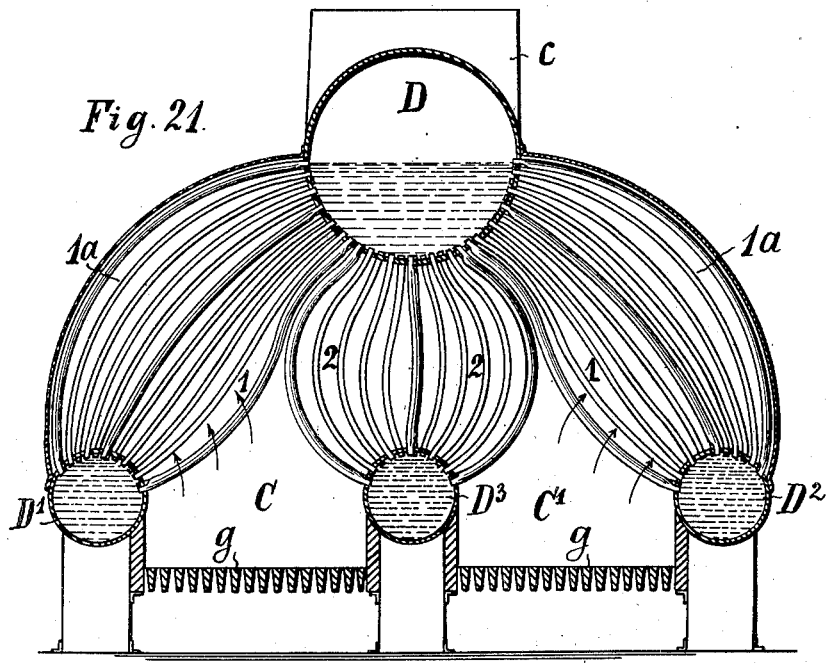

Figs. 18 and 21 show a modified arrangement of the flues shown in Figs. 17 and 20 in that the two parallel contiguous flue members 2 2 are formed by tubes connecting drum D with drum $D^3$, while the corresponding members 1 1 of the two flues are formed by tubes connecting drum D with drums D' $D^2$, the outer flue members 1ª being also formed by tubes connecting drum D with drums D' $D^2$, the flow of the products of combustion from the combustion-chambers C C' to chimney $c$ through said flues being clearly indicated by arrows.

In Figs. 19, 22, and 23 I have shown a further modification in the arrangement of the draft-flues of twin-furnace generators in which the contiguous flue members 1 1 are formed by tubes connecting the upper drums D and $D^\times$, Fig. 22, with the intermediate flue, members 2 2 being formed by tubes connecting said upper drum or drums with the outer lower drums D' and $D^2$, while the outer flue members 2ª 2ª are likewise formed by tubes connecting said upper drum or drums with said outer lower drums D' $D^2$, the flow of the products of combustion from the combustion-chambers C C' through said flues to the chimney $c$ or to the two chimneys $c$ $c'$, Fig. 22, being clearly indicated in Fig. 19.

In Figs. 24, 24ª, 25, and 26 I have shown my invention as applied to triple-furnace steam-generators either with suitably bent drum-connecting tubes, Figs. 24 and 25, or with perfectly straight tubes 24ª. In this arrangement the flue members 1 1 on either side of the central combustion-chamber $C^2$ are formed by tubes connecting the upper drum D or the two upper drums D and $D^\times$, Fig. 25, with the intermediate drums $D^3$ $D^4$, while the outer flue members 2 and 2ª are formed by tubes connecting upper drum D or the two upper drums D $D^\times$ with the lower outer drums D' $D^2$.

It will be observed that in the arrangement just described the flues for the three combustion-chambers intercommunicate, the flow of the products of combustion being clearly indicated in said Figs. 24, 24ª, 25, and 26.

Although not specifically referred to in the description of the arrangement of the flues, Figs. 17 to 26, it will be understood that in practice fire-gases are admitted directly from the combustion-chambers, together with air or other supporter of combustion, into the flues at some convenient point or points, and preferably into a transverse connecting flue member or members.

Having thus described my invention, what I claim as new therein, and desire to secure by Letters Patent, is—

1. A water-tube steam-generator comprising one or more upper drums, two or more lower drums, one or more combustion-chambers, water-tubes connecting said upper and lower drums, an outlet or outlets for the products of combustion and a longitudinal flue or flues formed by the juxtaposition of water-tubes, and a flue member or members extending transversely of said combustion-chamber at one end of the fire-space to connect longitudinal flues and form a horizontal continuous flue around said chamber, substantially as described.

2. A water-tube steam-generator comprising one or more upper drums, two or more lower drums, one or more combustion-chambers, water-tubes connecting said upper and lower drums, an outlet for the products of combustion, a longitudinal flue or flues formed by the juxtaposition of water-tubes and a flue member or members extending transversely of said chamber and connecting longitudinal flues to form a horizontal continuous passage for products of combustion around the chamber, substantially as described.

3. A water-tube steam-generator comprising one or more upper drums, two or more lower drums, one or more combustion-chambers, water-tubes connecting the upper and lower drums, an outlet or outlets for the products of combustion, a longitudinal flue or flues formed by the juxtaposition of water-tubes and transverse flue members connecting the ends of the longitudinal flues to form a continuous passage for the products of combustion around the chamber or chambers, substantially as described.

4. A water-tube steam-generator comprising one or more upper drums, a plurality of lower drums, a plurality of combustion-chambers, the number of combustion-chambers less by one than the number of lower drums, water-tubes connecting the upper and lower drums, an outlet or outlets for the products of combustion, longitudinal flues formed by the juxtaposition of water-tubes and transverse flues connecting the longitudinal flues to form continuous passages for the products of combustion and each continuous passage encompassing a combustion-chamber, substantially as and for the purpose described.

In testimony that I claim the foregoing as my invention I have signed my name in presence of two subscribing witnesses.

RICHARD SCHULZ.

Witnesses:
  JOHANNES HEIN,
  HENRY HASPER.